Oct. 27, 1942.　　　　J. SCHMIDINGER　　　　2,299,767
THERMALLY OPERATED SWITCH AND THE LIKE
Filed Feb. 2, 1940　　　3 Sheets-Sheet 1
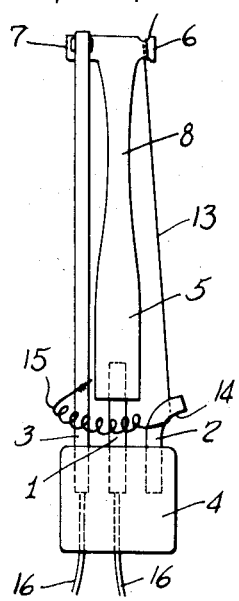
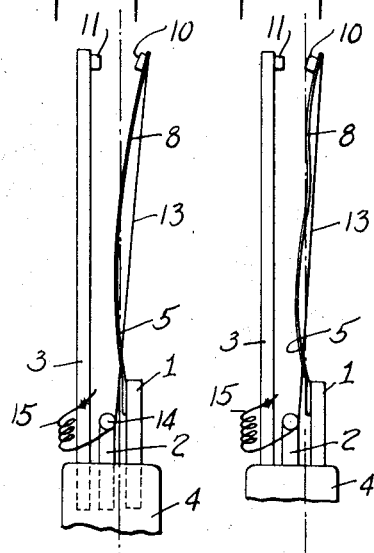
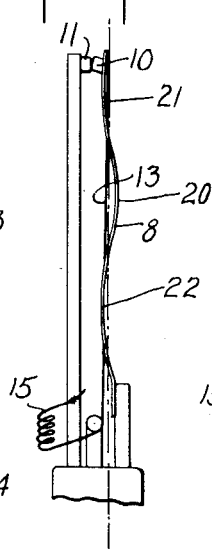
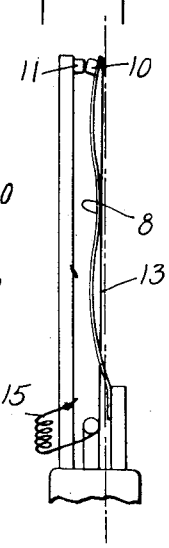
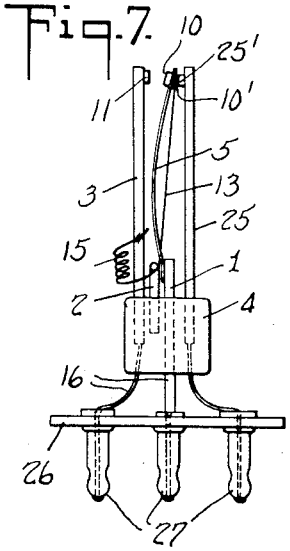
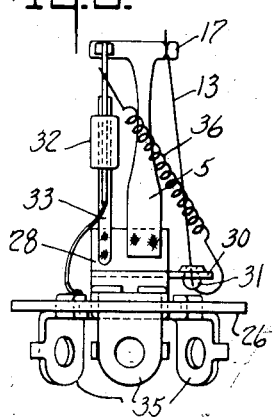
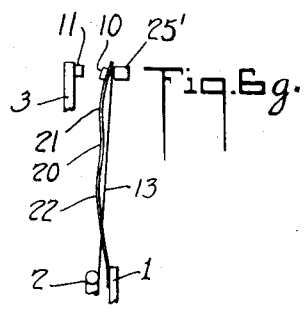
INVENTOR.
JOSEPH SCHMIDINGER
BY
ATTORNEYS Oct. 27, 1942.   J. SCHMIDINGER   2,299,767
THERMALLY OPERATED SWITCH AND THE LIKE
Filed Feb. 2, 1940   3 Sheets-Sheet 2

INVENTOR.
JOSEPH SCHMIDINGER
BY
Bartlett Pype Scott Keel
ATTORNEYS

Oct. 27, 1942.                     J. SCHMIDINGER                          2,299,767
                         THERMALLY OPERATED SWITCH AND THE LIKE
                              Filed Feb. 2, 1940            3 Sheets-Sheet 3
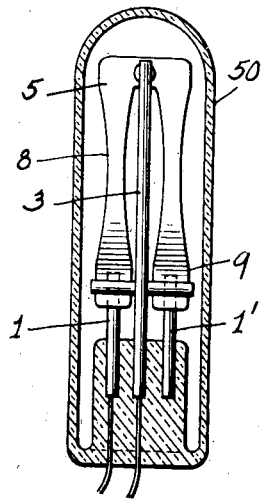
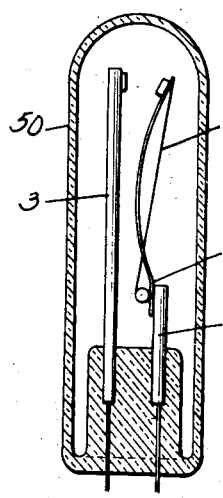
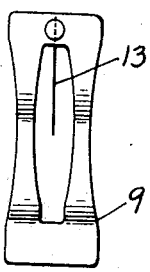
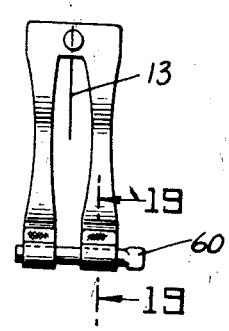
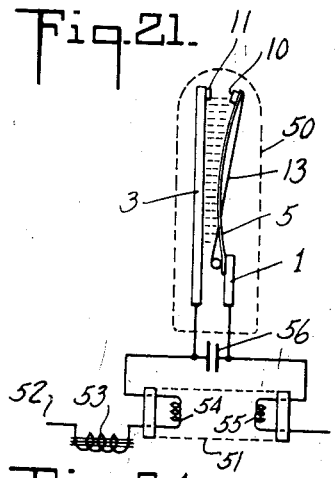
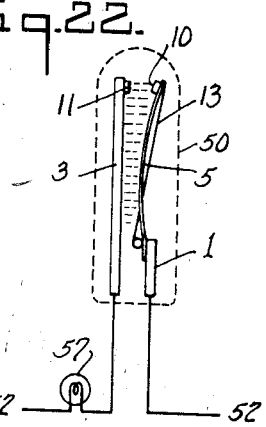
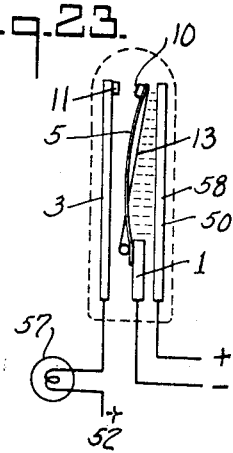
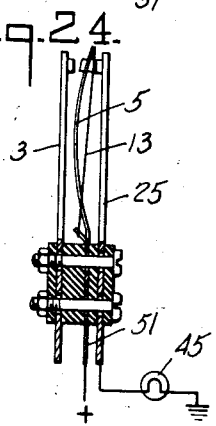
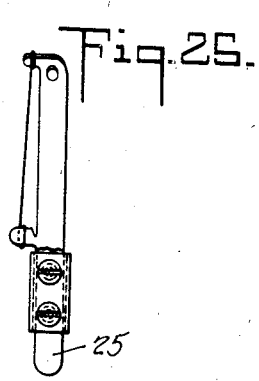
INVENTOR.
JOSEPH SCHMIDINGER
BY
ATTORNEYS Patented Oct. 27, 1942

2,299,767

UNITED STATES PATENT OFFICE 2,299,767

THERMALLY OPERATED SWITCH AND THE LIKE

Joseph Schmidinger, New York, N. Y.

Application February 2, 1940, Serial No. 316,889

19 Claims. (Cl. 200—122)

This invention relates to thermally operated switches, flashers and the like.

One object of the invention is a novel and improved thermally operated switch relay or the like which is characterized by its simplicity in construction, the precision with which it may be adjusted and its dependability, reliability and endurance in operation.

A further object of the invention is a novel and improved thermally operated and controlled switch enclosed in an envelope with neon gas and the like.

Further objects of the invention will hereinafter appear.

For a better understanding of the invention reference may be had to the accompanying drawings forming a part of this application, wherein:

Fig. 1 is a front view of a switch embodying the invention;

Fig. 2 is a view at right angles thereto;

Figs. 3, 4 and 5 are views illustrating the operation of the switch;

Fig. 6 is a series of views illustrating the steps in mounting and assembling of the switch of Figs. 1 and 2;

Fig. 6g shows a modification;

Fig. 7 is a view of a modified form of switch embodying the invention;

Figs. 8 and 9 are views of a further modification of the invention;

Figs. 16 and 17 are modified forms of switches for use with neon gas;

Fig. 16a is a view illustrating the step of the assembly of the switch of Figs. 16 and 17;

Fig. 18 is a detailed view of the vane thereof;

Fig. 19 is a section along the line 19—19 of Fig. 18;

Fig. 20 is a view of a modified form of vane;

Figure 10:
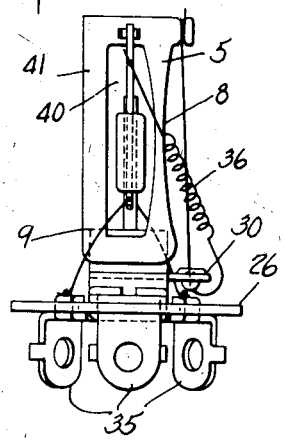
Figs. 10 and 11 are views of a further modification of the invention.

Figs. 21, 22 and 23 are views showing different uses of the switch shown in Figs. 16 and 17; and Figs. 24 and 25 are views of modified switch structures.

Referring to the drawings, I have illustrated in Figs. 1 and 2 views of a simple shunt, single circuit flasher or the like drawn to a scale several times larger than actual size for convenience in illustration. Wire supports 1, 2 and 3 are mounted in an insulating mass 4 as, for example, a glass press. The support 1 carries a vane 5 which is diminished in width intermediate its ends as shown in the drawings nearer the free end thereof as indicated at 8. This vane is mounted so as to form a continuation of the support 1, and is formed at its free ends with projections or lugs 6 and 7. The lug 6 forms an attachment for an expansible wire 13, this wire being attached to the lug 6 at one end and to the support 2 at the other end. These attachments may be formed in any suitable manner, as, for example, by welding, and after the wire is welded to the support wire 2 the wire is tightened to impart to it the desired tension by bending the wire 2 as indicated at 14. The support wire 3 is continued upwardly to a length substantially co-extensive with the length of the vane 5 and carries a contact 11 suitably fastened thereto as by welding. A ballast resistance 15 is electrically connected across the support wires 2 and 3, as indicated, so as to be in circuit when the contacts 10 and 11 are open and to be short circuited when these contacts are closed. Fig. 2 shows the position when the expansible wire 13 is cold, this wire holding the contacts 10 and 11 out of engagement with each other against the inherent tendency of the vane 5 to close these contacts. When the lines 16 are connected across the circuit (which circuit is omitted for convenience in illustration) current flows through the support 1, the vane 5, the wire 13, the ballast resistance 15 and the support 3 to the other side of the line. The heating of the expansible wire 13 due to the passage of this electrical current causes the same to expand and permits the closure of the contacts 10 and 11. As soon as the contacts 10 and 11 are closed the expansible wire 13 is short circuited through these contacts, the current flowing directly through the vane 5 and the support wire 3 with the result that the expansible wire 13 again cools and reopens the switch against the inherent tendency of the vane 5 to close the contacts. Fig. 3 shows the bowing of the vane 5 just before the contacts 10 and 11 are closed, the expansible wire 13 being heated by the current passing through it. Fig. 4 shows the bowed form of the vane 5 when the contacts are closed. Fig. 5 shows the form of the vane 5 just before the contacts 10 and 11 open, the expansible wire 13 now cooling off and operating the vane to open the contacts.

Both the closing and opening movements of the contacts are snap actions. This is effected by the structure mounting and assembly illustrated by steps in Fig. 6. The vane 5 is made of any suitable metal, as, for example, of spring metal preferably of a low coefficient of expansion which retains a constraint imposed thereon. The step a shows the vane 5 as simply a flat vane strip. The step b shows the upsetting or forming of the vane 5 to embody an intermediate curve 20 disposed between two curves 21 and 22, the latter being formed reversely to the curve 20, with the curvatures 21 and 22 having their convex sides disposed on the side of the contact or stop member 11. The mounting end 23 of the vane is formed to occupy an angle indicated at 9 to the main body of the strip so that when the vane 5 is mounted on the support 1 the curved strip occupies the position indicated in step c, namely, with the main body thereof out of the plane of the fastening surface of the support 1. The expansible wire 13 is then fastened at one end to the free end of or at a point toward the free end of the vane, as, for example, to the projection 6 formed thereon and at its other end to the support 2, with the wire 13 being disposed approximately in the plane of the reversely curved vane. The wire 13 is then tightened by bending the wire 2 at 14 which forces the top of the vane with contact 10 against the contact 11 of the contact arm 3, as shown in step e. The wire support 3 is then bent in the direction to oppose the constraint formed by the bias 9 at the end 23 of the vane until the vane suddenly snaps away and forms a configuration essentially as shown in step f (Fig. 2), namely, a bow. It is noted that the reverse bow of the weaker section 8 of the vane 5 is practically straightened under the pulling strain of the wire and the influence of the stronger end sections of the vane. Since the line of pull of the wire 13 is past equilibrium center, the vane is held in this position, which is the cold, open contact position.

In the modifications shown in Figs. 1 to 6 the switch is adapted to comparatively large movements. In certain cases it may be desired to limit the movement of the movable switch contact to an extent substantially smaller than that indicated in these figures. Such modification is shown in Fig. 6g wherein I have shown a stop 25', which may function also as a contact, which limits the movement of the free end of the vane 5 in its movement away from the stop or contact 11 and in this limiting position the vane 5 is not permitted to assume the bowed position indicated in Fig. 6f, but rather embodies the irregular curve 21, 20, 22 as indicated.

Upon the connection of a suitable source of electrical current across the wires 1 and 3, wire 13 will heat and expand and will allow vane 5 by the force of its bias at 9 to begin moving toward contact 11 (Fig. 3), it being noted that section 8 of the vane is reforming its reverse bow during this lessening of tension of the wire.

As the heating and expansion progress, the vane, still moving by the force of its bias, will bring the tension line of wire 13 past equilibrium center at which point the vane will suddenly snap into engagement with the stationary contact 11 (Fig. 4). In this position the section 8 of the vane has completely reformed its reverse or opposite bow and in this position this reverse bow is now to the right of the line of pull of the wire 13, which causes the remaining pull of the wire to hold the contacts firmly together. The instant the contacts 10 and 11 meet the expansible wire 13 is short-circuited and begins to cool and contract and builds up pressure on the contacts.

The contact arm being rigid the result is an endwise compression of the vane 5 which first causes contact 10 to slide on the face of contact 11 and as contraction progresses causes the stronger end section of vane 5 to force the weaker section 8 to the left past the line of pull of the wire 13. Fig. 5 shows this intermediate (contact breaking) position at the instant when section 8 has passed the line and the wire is about to snap the vane into open position as shown in Fig. 2.

In the modification of Fig. 7 an additional contact arm 25, which carries a contact 25' at its outer end for engagement with a contact 10', is carried on the outer end of the vane 5 on the opposite side of the contact 10. This additional arm 25 is so mounted as to have its contact 25' engage the contact 10' when the expansible wire 13 is cooled and thus an alternating two circuit flasher is formed. In this case the switch structure is mounted on an insulating base 26 of Bakelite or the like, and this circular or wafer base carries hollow pin terminals 27 of the type commonly used by automobile manufacturers for quick lamp and other electrical connections in conjunction with conventional socket tipped wires not illustrated. The wire 1 of this unit is brought through the glass and welded or tip soldered into a central terminal and the thinner flexible leads from the contact arms are welded or tip soldered as indicated. This unit has the advantage that it is particularly sturdy and can be inexpensively manufactured on a quantity production basis, and, moreover, it may be connected and disconnected very quickly by the user.

In the modifications of Figs. 8 and 9 the vane 5 is mounted on an eyelet carrying bracket 28 which is mounted on the insulating base 26, with the end of the vane 5 fastened to an upright arm 29 formed on the bracket. The bracket is provided with an arm 30 having an eyelet formed therein for accommodation of the wire 13 and an anchoring insulating bead 31 mounted in said eyelet. The center of the hole of this eyelet is substantially in line with the biased end of the vane. The contact carrying arms are mounted in a glass mount 32 and the assembly is supported by welding or clamping the central support wire 33 to the bracket 28. The insulated tension of the pull wire 13 is maintained by the glass bead 31 which is fused around the wire and rests in the eyelet of the arm 30 and the tension adjustment is effected by bending the neck or arm of the eyelet or by application of a small socket wrench or other suitable tool which fits over the arm 30 or a projection therefrom. The contact carrying arms 3 and 25 are connected by flexible conductors 34 with two of the three terminals 35. The other terminal 35 is electrically and mechanically connected with the bracket 28 as indicated and the contact arm 3 is connected with the expansible wire 13 by means of a conductor 36. The operation is generally similar to the operation described above with respect to the modification of Figs. 1 and 7. When the wire 13 is cooled the free end of the vane 5 makes electrical contact with the arm 25, and when the wire 13 is heated sufficiently to permit the bias or constraint in the vane 5 to shift over, the vane snaps over into contact with the contact 11 carried by the arm 3. A snap action is obtained in both directions.

Figure 11:
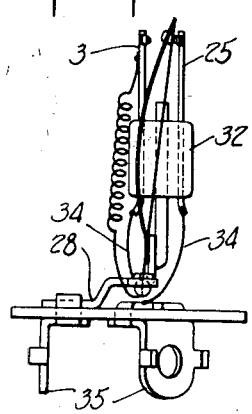

In the modification of Figs. 10 and 11 the vane 5 is punched out of a relatively broad strip of flexible sheet metal with a slot 40 formed in the center of the strip, and with a supporting side 41 formed on the opposite side of this slot from the vane 5. This whole strip including the vane 5 is mounted on a bracket 28 similar to that described above in Figs. 8 and 9 and the bias 9 of the strip is formed all the way across, namely, through both vane 5 and the supporting side 41. The construction is otherwise similar to that of Figs. 8 and 9 and the operation is substantially the same. The construction of Figs. 10 and 11 has a particular advantage in that the vane 5 is not obliged to carry the whole current since the side member 41 carries its share and, accordingly, heavier currents may be handled without undue heating of the vane and the structure lends itself particularly for uses in which heavy contact pressures are desired.

Figure 12:
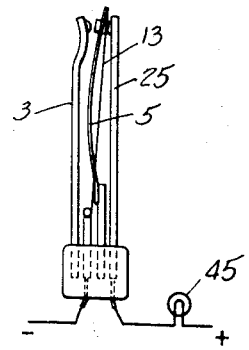
Fig. 12 is a view of the switch used as a flasher.

Fig. 12 shows the use of the device illustrated in Figs. 7 to 11. There is a series switch or flasher. In this case the wire or support 3 acts merely as a stop to limit the movement of the free end of the vane 5 when the expansible wire 13 is heated and thereby preventing the vane from moving to a point from which the expansible wire could not return it. The expansible wire 13 is connected in series in the circuit as shown, a lamp or other suitable device 45 being shown in the circuit, so that when the circuit is closed the current heats the expansible wire 13 and permits the vane 5 to snap out of contact with the contact carried by the upper end of the arm 25. The circuit being broken the wire 13 cools and snaps the vane carried contact back into engagement with the contact on the arm 25 and this action is repeated indefinitely.

Figure 13:
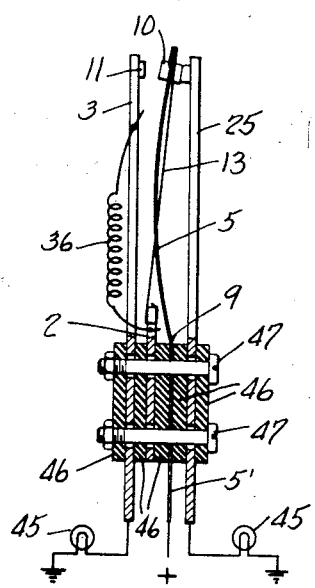
Figs. 13 and 14 are views of modified forms of switches.
Figure 14:
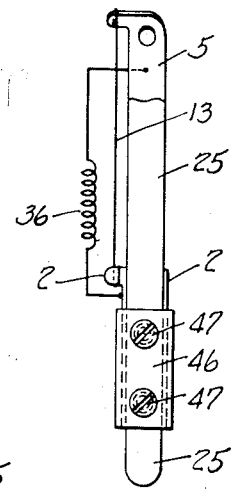

In the modification of Figs. 13 and 14 the vane 5, the member 2 to which the wire 13 is fastened, and the contact carrying members 3 and 25 are clamped tightly together between insulating washers 46 as by means of two clamping bolts 47 passing therethrough. The bias of the vane 5 is formed at 9 and the vane is extended downwardly into a part 5' leading to one of the terminals of the circuit.

The arms 3 and 25 form the other sides of the two alternating flashing circuits containing lamps or equivalent devices 45 which are indicated as connected on one side to the ground or negative side of the circuit. The pull wire 13 is connected in circuit with the ballast resistance 36 in series with one of the lamps 45, but is short circuited when the contacts 10 and 11 are brought together by the heating of the wire 13, thus resulting in the continued flashing operation.

Figure 15:
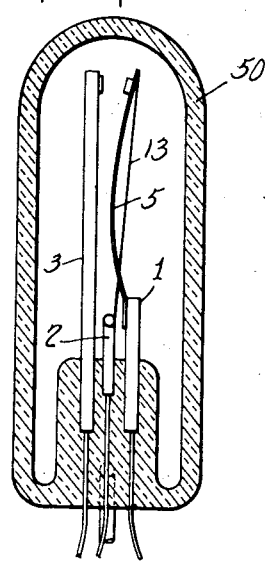
Fig. 15 is a view of the switch shown in Figs. 1 and 2 enclosed in an envelope to be operated by neon gas.

In the embodiment of Fig. 15 the mechanism is enclosed in a glass envelope 50 containing neon gas or the like. The embodiment of Fig. 1 is illustrated in this Fig. 15 but it is understood that any of the other modifications may be included in this envelope 50.

One use of the modification of Fig. 15 is illustrated in Fig. 21 wherein it is used for a starting switch for fluorescent lamps, such lamp being indicated at 51 and being supplied with current from the supply lines 52. In series with the lamp 51 is connected a choke coil 53. The circuit leads through the choke coil 53 a filament or electrode 54 of the fluorescent lamp, the contact carrying arm 3, the contacts 10 and 11, the vane 5, the member 1, the other filament or electrode 55 of the lamp and thence to the line. A condenser 56 is illustrated as connected across the contacts 10 and 11. The operation of this circuit is as follows:

When suitable voltage is applied a discharge flows between the arm 3 and the vane 5 and wire 13 as indicated by broken lines. This discharge heats the wire 13 which thereupon expands and permits the contacts 10 and 11 to snap into closed position due to the bias or inherent constraint in the vane 5. This permits full current to flow in the circuit limited only by the choke 53 and the resistance of the filaments or electrodes 54 and 55, the latter thereupon becoming heated. The instant the contacts 10 and 11 are closed the neon glow discharge ceases due to the short circuiting of the neon gas, whereupon the pull wire 13 cools and again snaps the contacts 10 and 11 apart. The fluorescent tube filaments or electrodes 29 and 30, having been heated, are now discharging one from the other with the flow of current passing directly between the electrodes 54 and 55. While the fluorescent lamp 51 is operating, the voltage drop across the switch terminals is lower than the required breakdown voltage for neon gas and thus the wire 13 is maintained cool and the contacts 10 and 11 are separated at all times while the fluorescent lamp or tube consumes its normal running current and is operating.

Fig. 22 shows another use of the device of Fig. 15. Here it is used as a series flasher with the lamp bulb or other load 57 connected in the circuit. Upon the first closure of the line circuit the neon gas in the tube 50 breaks down and there is a discharge as indicated which heats the wire 13. The heating and expansion of the wire 13 results in the closure of the contacts 10 and 11 which short circuits the heating glow whereupon the wire 13 again cools and opens the contacts. This operation continues.

Fig. 23 shows a modified neon actuated relay. Here an additional electrode 58 is contained in the tube 50 and is connected as, for example, with the positive side of the line, the vane 5 being connected with the negative side of the line. The load 57 which is connected with the electrode 3 remains disconnected until the circuit of the members 1 and 58 is connected to supply sufficient voltage between the vane 5 and the wire 13 and the electrode 58 to cause a heating glow for heating the wire 13 sufficiently to permit the closure of the contacts 10 and 11.

Figs. 16 to 19 show another modification of a switch in which the pull wire is expanded by rising surrounding temperature, neon glow, electronic bombardment, etc. Here a double or U-shaped vane 5 is shown having the ends of its two legs mounted on the posts 1 and 1'. The pull wire 13 is fastened at one end to the cross or bridging member of the U-shaped vane and at its other end to an adjusting wire or pin 60. This pin or adjusting wire 60, after the pull wire is fastened thereto at a point intermediate the legs of the vane 5, is welded to one side of the vane, and then bent or moved downward until proper tension is obtained and is then welded to the other side of the vane or vane's port. In the particular embodiment of Figs. 18 and 19 the adjusting pin or wire 60 is mounted in journals formed by bending the ends of the legs of the U-shaped vane back upon themselves as indicated at 61 and the wire 13 may be readily tightened and given the required tension by engaging the flattened end of the wire or pin 60 to rotate the same in its journal. The vane 5 is preferably provided with reduced sections 8 in each of its legs, corresponding to the reduced section 8 of Fig. 1, and the pull of the wire 13 is substantially in the plane of the vane.

In the embodiment of Fig. 20 the double vane is joined both at the top and the bottom and the whole is integrally formed out of a single sheet of metal and the two legs of the vane are mounted, biased and put under constraint preferably in substantially the manner described above with respect to the modification of Fig. 1.

Fig. 16a illustrates a method of fastening and tensioning the wire 13 of the modification of Figs. 16 and 17, described above, wherein the fastening wire or pin 60 is formed with reduced section 60' to permit the easy bending thereof from the dash and dotted lines indicated for the purpose of applying the desired tension to the wire 13.

The modifications of Figs. 25 and 26 are similar to those of Figs. 13 and 14 and differ therefrom in that the pull wire 13 is connected at both ends to the vane 5 and is, therefore, not connected in the electrical circuit. The pull wire here is expanded and contracted by the temperatures of the surrounding atmosphere, which makes this device useful for fire alarms and other temperature indications. Here the arm 3 functions as a stop to limit the movement of the end of the vane under the influence of its bias or inherent constraint.

I claim:

1. A thermal switch structure comprising a deformable double bowed vane mounted at one end and having a bias therein tending to move the free end of the vane in one direction and an expansible pull wire disposed generally in the plane of the vane and fastened at one end to the free end thereof, said expansible wire being anchored at its other end at a fixed point spaced from said vane so as to exert a straight line pull in the plane containing said fixed point and the end of the vane and being placed under tension to hold the free end of said vane in one position of equilibrium against the bias thereof while the expansible wire is cool and permitting upon the heating thereof the shift of the free end of said vane over to another position, said vane being deformed by said wire from its normal double bowed shape when the free end is in said first position.

2. A thermal switch structure comprising a deformable double bowed vane mounted at one end and having a bias therein tending to move the free end of the vane in one direction and an expansible pull wire disposed generally in the plane of the vane and fastened at one end to the free end thereof, said expansible wire being anchored at its other end at a fixed point spaced from said vane so as to exert a straight line pull in the plane containing said fixed point and the end of the vane and being placed under tension to hold the free end of said vane in one position of equilibrium against the bias thereof while the expansible wire is cool and permitting upon the heating thereof the shift of the free end of said vane over to another position, and a stop limiting the movement of the free end of the vane while the expansible pull wire is hot to a position which permits the wire when cooled to shift the vane over to the first named position of equilibrium, said vane during movement of the free end thereof away from said stop, deforming from its normal double bowed form.

3. In a thermal switch, a stop member, a vane mounted at one end with the other end movable toward and away from said stop member and in directions at right angles to the plane of the vane, said vane having formed therein curvatures adjacent the ends thereof with their convexities towards the side of the stop member and an intermediate reverse curvature, the mounting of said vane giving the vane a bias in one direction and an expansible pull wire fastened at one end to the free end of said vane and exerting while hot a pull substantially in the plane of the inner curved portion of said vane with the free end of the latter resting against said stop and when cooled holding the free end of the vane in a position of equilibrium removed from said stop with the intermediate curvature of the vane in that position snapped over against its inherent constraint to form a bow of the vane.

4. In a thermal switch, a spring vane having formed therein curvatures adjacent the ends thereof with an intermediate reverse curvature therebetween and being mounted at one end, a movable contact carried by said vane at a point removed from the mount, an expansible pull wire fastened at one end adjacent the free end of the vane and fastened at its other end and tensioned to exert a pull upon said vane generally in the plane of the vane to cause the vane to occupy one position of equilibrium with its intermediate curvature snapped over against its inherent constraint to form a bow while the expansible wire is cool and to permit the vane to occupy substantially its inherent constraint position while the wire is hot, and a single stationary contact cooperating with said movable contact.

5. In a thermal switch a deformable double bowed spring vane mounted at one end and carrying a movable contact at a point removed from the mount, an expansible pull wire fastened at one end adjacent the free end of the vane and fastened at its other end and tensioned to exert a pull upon said vane generally in the plane of the vane and in a straight line between its point of fastening to the vane and its fixed end to deform the vane from its normal double bowed form and to cause it to occupy one position of equilibrium while the expansible wire is cool and to permit the vane to occupy another position while the wire is hot and stationary contacts disposed on the opposite sides of said vane and cooperating therewith.

6. A thermal switch structure comprising a deformable double bowed vane mounted at one end and having a bias therein tending to move the free end of the vane in one direction and an expansible pull wire disposed generally in the plane of the vane and fastened at one end to the free end thereof, said expansible wire being anchored at its other end at a fixed point spaced from said vane so as to exert a straight line pull in the plane containing said fixed point and the end of the vane and being placed under tension to hold the free end of said vane in one position of equilibrium against the bias thereof while the expansible wire is cool and permitting upon the heating thereof the shift of the free end of said vane over to another position, said vane being deformed by said wire from its normal double bowed shape when the free end is in said first position, the said vane varying in width, with the intermediate portion thereof being narrower than the end portions.

7. A thermal switch structure comprising a deformable double bowed vane mounted at one end and having a bias therein tending to move the free end of the vane in one direction and an expansible pull wire disposed generally in the plane of the vane and fastened at one end to the free end thereof, said expansible wire being anchored at its other end at a fixed point spaced from said vane so as to exert a straight line pull in the plane containing said fixed point and the end of the vane and being placed under tension to hold the free end of said vane in one position of equilibrium against the bias thereof while the expansible wire is cool and permitting upon the heating thereof the shift of the free end of said vane over to another position, said vane being deformed by said wire from its normal double bowed shape when the free end is in said first position, the said vane varying in width, with the intermediate portion thereof being narrower than the end portions, and the narrowest portion of said vane being nearer the free end than the mounted end of the vane.

8. A thermal switch structure comprising a deformable double bowed vane mounted at one end and having a bias therein tending to move the free end of the vane in one direction and an expansible pull wire disposed generally in the plane of the vane and fastened at one end to the free end thereof, said expansible wire being anchored at its other end at a fixed point spaced from said vane so as to exert a straight line pull in the plane containing said fixed point and the end of the vane and being placed under tension to hold the free end of said vane in one position of equilibrium against the bias thereof while the expansible wire is cool and permitting upon the heating thereof the shift of the free end of said vane over to another position, and a stop limiting the movement of the free end of the vane while the expansible pull wire is hot to a position which permits the wire when cooled to shift the vane over to the first named position of equilibrium, said vane during movement of the free end thereof away from said stop, deforming from its normal double bowed form, with a vane support, an anchor for the pull wire, and a support for the stop mounted in a glass press forming the closure of an envelope containing neon gas and the like.

9. A thermal switch structure comprising a deformable double bowed vane mounted at one end and having a bias therein tending to move the free end of the vane in one direction and an expansible pull wire disposed generally in the plane of the vane and fastened at one end to the free end thereof, said expansible wire being anchored at its other end at a fixed point spaced from said vane so as to exert a straight line pull in the plane containing said fixed point and the end of the vane and being placed under tension to hold the free end of said vane in one position of equilibrium against the bias thereof while the expansible wire is cool and permitting upon the heating thereof the shift of the free end of said vane over to another position, said vane being deformed by said wire from its normal double bowed shape when the free end is in said first position, the free end of the vane being provided with an offset or lug part to which the expansible pull wire is attached.

10. A thermal switch structure comprising a deformable double bowed vane mounted at one end and having a bias therein tending to move the free end of the vane in one direction and an expansible pull wire disposed generally in the plane of the vane and fastened at one end to the free end thereof, said expansible wire being anchored at its other end at a fixed point spaced from said vane so as to exert a straight line pull in the plane containing said fixed point and the end of the vane and being placed under tension to hold the free end of said vane in one position of equilibrium against the bias thereof while the expansible wire is cool and permitting upon the heating thereof the shift of the free end of said vane over to another position, and a stop limiting the movement of the free end of the vane while the expansible pull wire is hot to a position which permits the wire when cooled to shift the vane over to the first named position of equilibrium, said vane during movement of the free end thereof away from said stop, deforming from its normal double bowed form, a support for the stop and the fastened end of the vane being rigidly clamped together between insulating supports and with insulation therebetween.

11. A thermal switch structure comprising a deformable double bowed vane mounted at one end and having a bias therein tending to move the free end of the vane in one direction and an expansible pull wire disposed generally in the plane of the vane and fastened at one end to the free end thereof, said expansible wire being anchored at its other end at a fixed point spaced from said vane so as to exert a straight line pull in the plane containing said fixed point and the end of the vane and being placed under tension to hold the free end of said vane in one position of equilibrium against the bias thereof while the expansible wire is cool and permitting upon the heating thereof the shift of the free end of said vane over to another position, said vane being deformed by said wire from its normal double bowed shape when the free end is in said first position, the said vane comprising a double strip integrally formed from sheet metal.

12. In a thermal switch, a vane comprising a pair of vane strips integrally formed from sheet metal and mounted and constrained to occupy a definite position under its inherent constraint and an expansible pull wire fastened at one end to the free end of the vane and being anchored at its other end at a fixed point spaced from said vane so as to exert a straight line pull in the plane containing said point and the end of the vane, said wire being disposed substantially in the plane of the vane when the wire is hot and when cooled exerting a pull on the vane to cause the same to occupy a bowed position against the inherent constraint therein.

13. In a thermal switch, a vane comprising a pair of vane strips integrally formed from sheet metal and mounted and constrained to occupy a definite position under its inherent constraint and an expansible pull wire fastened at one end of the vane and being anchored at its other end at a fixed point spaced from said vane so as to exert a straight line pull in the plane containing said point and the end of the vane, said wire being disposed substantially in the plane of the vane when the wire is hot and when cooled exerting a pull on the vane to cause the same to occupy a bowed position against the inherent constraint therein, said vane strips being narrowed intermediate their ends and at their mounted ends support a pull wire tensioning device.

14. In a thermal switch, a vane comprising a pair of vane strips integrally formed from sheet metal and mounted and constrained to occupy a definite position under its inherent constraint and an expansible pull wire fastened at one end to the free end of the vane and being anchored at its other end at a fixed point spaced from said vane so as to exert a straight line pull in the plane containing said point and the end of the vane, said wire being disposed substantially in the plane of the vane when the wire is hot and when cooled exerting a pull on the vane to cause the same to occupy a bowed position against the inherent constraint therein, the two vane strips being integrally formed both at their mounted ends and their free ends with the pull wire passing between the same.

15. In a thermal switch, a single deformable double bowed vane strip integrally formed from a metallic sheet with one side of the sheet forming the support for the vane, said sheet being mounted and biased to cause the free end thereof to tend to occupy one position and an expansible pull wire connected at one end to the free end of the sheet and fastened at its other end to a fixed point spaced from said sheet and tensioned to exert a constraining pull substantially lengthwise of the vane in one position and in a straight line between its point of connection to the vane and its fixed other end and a stationary contact co-operating with a movable contact carried by the sheet, said vane strip deforming from its normal double bowed shape during movement of the free end away from said stationary contact.

16. A thermal switch structure comprising a deformable double bowed vane mounted at one end and having a bias therein tending to move the free end of the vane in one direction and an expansible pull wire disposed generally in the plane of the vane and fastened at one end to the free end thereof, said expansible wire being anchored at its other end at a fixed point spaced from said vane so as to exert a straight line pull in the plane containing said fixed point and the end of the vane and being placed under tension to hold the free end of said vane in one position of equilibrium against the bias thereof while the expansible wire is cool and permitting upon the heating thereof the shift of the free end of said vane over to another position, said vane being deformed by said wire from its normal double bowed shape when the free end is in said first position, said switch structure being mounted in an envelope containing neon gas and the like.

17. In a thermostatic switch, a double bowed vane mounted at one end and deformable past equilibrium center into two different positions of the free end thereof, a fixed stop positioned to be engaged by the free end of said vane in one of said positions, said vane being mounted to be biased toward the stop-engaging position, an expansible pull wire fixed at one end and secured at its other end to the free end of said vane and constraining said vane in both positions of the end thereof by a straight line pull substantially lengthwise of said vane and toward said mounted end, the tension of said wire when cold holding the end of said vane out of engagement with said stop, and when hot permitting deformation of said vane past equilibrium center and causing the end of said vane to snap into engagement with said stop.

18. A thermal switch structure comprising a vane mounted at one end and having a bias therein tending to move the free end of the vane in one direction, and an expansible pull wire disposed generally in the plane of the vane and fastened at one end to the vane at a point adjacent the free end thereof, said expansible wire being anchored at its other end at a fixed point and being spaced from said vane except at the point of attachment thereto and spaced from the vane so as to exert a straight line pull in a plane containing said fixed point and the point of attachment to the vane and being placed under tension to hold the free end of the vane in one position of equilibrium against the bias thereof while the expansible wire is cool and permitting upon the heating thereof a shift of the free end of said vane over to another position.

19. A thermal switch structure comprising a substantially straight spring vane mounted at one end and having a bias therein tending to move the free end of the vane in one direction, and an expansible pull wire disposed generally in the plane of the vane and fastened at one end to the vane at a point adjacent the free end thereof, said expansible wire being anchored at its other end at a fixed point and being spaced from said vane except at the point of attachment thereto and spaced from the vane so as to exert a straight line pull in a plane containing said fixed point and the point of attachment to the vane and being placed under tension to hold the free end of the vane in one position of equilibrium against the bias thereof while the expansible wire is cool and permitting upon the heating thereof a shift of the free end of said vane over to another position.

JOSEPH SCHMIDINGER.

CERTIFICATE OF CORRECTION.

Patent No. 2,299,767. October 27, 1942.

JOSEPH SCHMIDINGER.

It is hereby certified that error appears in the printed specification of the above numbered patent requiring correction as follows: Page 5, second column, line 50, claim 13, after "end" insert --to the free end--; and that the said Letters Patent should be read with this correction therein that the same may conform to the record of the case in the Patent Office.

Signed and sealed this 22nd day of December, A. D. 1942.

(Seal)

Henry Van Arsdale,
Acting Commissioner of Patents.